May 24, 1927.
L. J. ANDERSSON
BELT FASTENER
Filed March 22, 1921
1,629,983
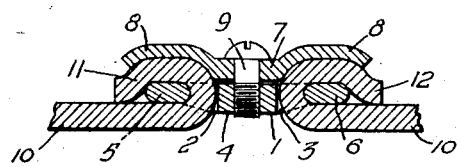
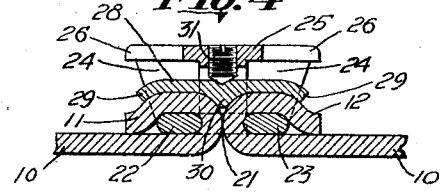
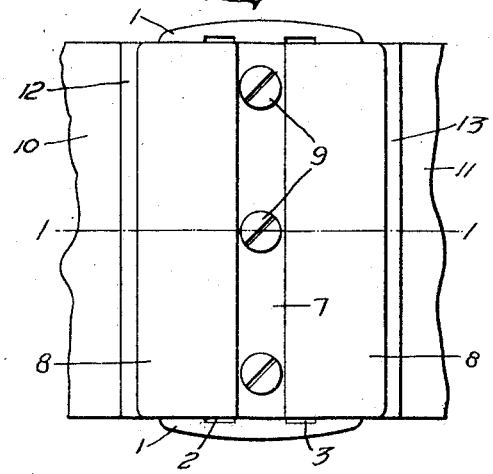
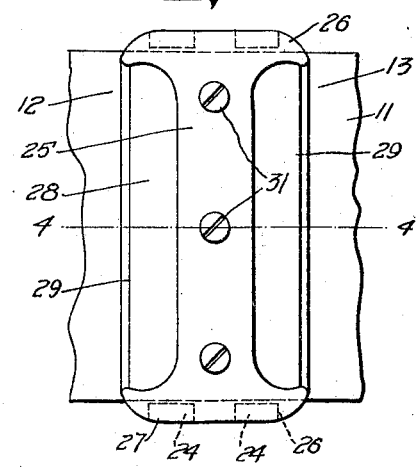
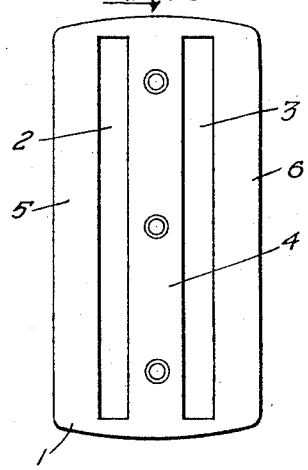
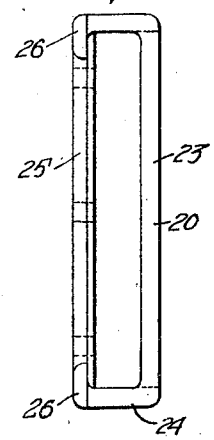
INVENTOR
Lars Johan Andersson
BY
Duell, Warfield & Duell
ATTORNEY Patented May 24, 1927.

1,629,983

UNITED STATES PATENT OFFICE.

LARS JOHAN ANDERSSON, OF HALMSTAD, SWEDEN.

BELT FASTENER.

Application filed March 22, 1921. Serial No. 454,379.

This invention relates to a belt fastener and with respect to some of its specific details to a metallic fastening means adapted to join two adjacent ends of belting used in the transmission of power.

It is an object of the invention to provide an improved fastening means of the class mentioned which is adapted to avoid perforating or mutilating the belt and to avoid all sharp tongues or similar projections liable to extend into the surface of the belt.

It is a further object to provide an improved securing means of the class mentioned which will permit the belt to be easily tightened at any time without the necessity of any special tools.

It is a further object to provide an improved securing means for a belt which runs evenly and smoothly over the pulley without noise or jar.

It is a further object to provide an improved fastening means of the class mentioned which is simple in construction, strong and reliable in use, easily and quickly applied or removed, and comparatively inexpensive in manufacturing cost.

Other objects will be obvious in connection with the following detailed description.

The invention accordingly consists in the features of construction, combinations of elements and arrangement of parts which will be exemplified in the construction hereinafter set forth, and the scope of the application of which will be indicated in the following claims.

In the accompanying drawings forming part of this specification in which two illustrative embodiments of the invention are shown, Figure 1 is a sectional view of the invention applied to two adjacent ends of a belt, the section being taken on the line 1—1 of Fig. 2;

Fig. 2 is a plan view of the device shown in Fig. 1;

Fig. 3 is a plan view of a base plate shown in Figs. 1 and 2;

Fig. 4 is a sectional view of a second embodiment of the invention, the section being taken approximately on the line 4—4 of Fig. 5;

Fig. 5 is a plan view of the construction shown in Fig. 4; and

Fig. 6 is a side elevation of the casing or securing element shown in Figs. 4 and 5.

Referring to the drawings for a detailed description of the invention, the embodiment shown in Figs. 1 to 3 is designed particularly for use in connection with wide and heavy belts used to convey large amounts of power. In this embodiment of the invention a bottom or base plate 1, preferably of metal, is provided having spaced openings 2 and 3 therein through which the ends of the belt are adapted to extend. Between these openings extends a bar 4 having threaded apertures therein and spaced outside of said openings there are carrying lugs or bars 5 and 6. The ends of the plate 1 extend somewhat beyond the lines of the belt edges, as shown in Fig. 2, these extended ends being curved so as to reduce shocks and vibration which may be due to engagement with belt guiding means or other similar devices engaging the belt edges. A securing or friction plate 7 is provided for engaging and holding the ends of the belt. As shown this plate is preferably of a length corresponding to the width of the belt and has two lateral projections or wings 8 which are inclined or curved to correspond to the contour of the ends of the belt. Holes are provided in this friction plate through which extend screws 9 or similar securing devices which are threaded to engage the threads in the apertures of central bar 4. The friction plate 7 and base plate 1 may be ribbed or serrated to increase frictional engagement with the belt. The base plate may likewise be termed a friction plate since its function is to engage frictionally with the ends of the belt.

In the operation of the device illustrated in Figs. 1, 2, and 3, the friction plate 7 is removed from the base plate 1 by the removal of the securing devices 9. The adjacent ends 10 of the belt are then extended upwardly through the apertures 2 and 3 and looped backwardly as shown at 11 and 12. The friction plate 7 is then reapplied in position with the lateral wings thereof engaging the backwardly looped ends of the belt and the securing screws 9 are replaced and screwed down tightly to secure the frictional plate in frictional engagement with the looped ends. If it is desired to insert the ends of the belt in the securing device without entirely removing the friction plate 7 this may be done by simply loosening the screws 9 so as to provide sufficient space for the insertion of the belt ends between the base plate 1 and the wings of the friction plate. In this case, as the end of the belt is inserted from below through the aperture 2 or 3, it engages the curved undersurface of the wing portion of the friction plate lying adjacent to the aperture and is thus guided into securing position.

The modification of the invention shown in Figs. 4 to 6 is now considered the preferred embodiment. In this modification a base plate 20 is employed corresponding generally to the base plate of the modification described in detail above. This base plate has an aperture 21 therein through which both ends of the belt are adapted to extend, and transverse bars 22 and 23 around which the ends of the belt are adapted to be looped when in securing position. At each end of the base plate 20 there are angular extensions or projections 24 carrying at their outer ends a spaced plate 25 which is disposed substantially parallel to the base plate 20. This construction provides a box member or casing which is adapted to receive the adjacent ends of the belt. As shown in Fig. 5 the spaced plate 25 is provided with angularly extending portions or enlargements 26 at each end integral with the angular extensions 24. The base plate 20 and spaced plate 25 are preferably integrally secured to the angular end plates 24, but it is obvious that other means of securing these parts may be employed if desirable. The enlargements 26 of the spaced plate 25 are provided with curved extremities 27 corresponding to the curved extremities of the base plate 20, the latter extending beyond the lines of the belt edges and being curved in a manner corresponding to and for the same purpose as the curved extremities of plate 1 in the modification of Figs. 1 to 3 described above. The securing or friction plate 28, similar in general to friction plate 7, is provided for holding in position the ends of the belt which are looped around the bars 22 and 23 when in securing relationship to the fastening device. This friction plate has oppositely extending wings 29, the under surfaces of which are inclined or curved to conform to the curvature of the belt ends. A rib 30 is also provided on the under side of said friction plate extending longitudinally thereof and adapted to lie when in securing position between the adjacent looped ends of the belt so as to hold the latter securely in position. The spaced plate 25 is provided with threaded openings through which correspondingly threaded set screws 31 extend. The set screws are rounded or otherwise suitably formed at their inner ends to engage correspondingly formed seats in the surface of the friction plate 28.

The operation of the device disclosed in Figs. 4 to 6 is generally similar to that of the other modification previously described. In this case the screws 31 are loosened as much as possible and the friction plate 28 lifted away from the base plate. The ends 11 and 12 of the belt 10 are then pushed through the aperture 21 in the base plate and when striking the curved surface of the under side of the friction plate adjacent the rib 30 are guided laterally between the base plate and friction plate. The ends are pushed in as far as desirable and the friction plate is then forced down into securing position by means of the set screws 31. The looped ends of the belt are thus held securely in position.

It is obvious that the type of securing device as disclosed in this application is well adapted for use in connection with belts which are made of leather, rubber, cotton or other similar materials. Also by the use of this type of fastening all punching or other mutilating of the ends of the belt is avoided and all sharp projections extending into the belt surfaces are dispensed with.

If the ends of very wide belts are to be joined the base plate or casing could be made in the single piece while the friction plate could be made up in a plurality of sections, if desired.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

I claim—

1. In a belt fastener, in combination, a casing having a base plate and a second plate spaced therefrom, a friction plate interposed between said first mentioned plates, means for adjusting the distance between said base plate and said friction plate, and means for guiding an end of the belt into securing position between said base plate and said friction plate.

2. In a belt fastener, in combination, a casing having a plate with an opening therein through which an end of the belt is adapted to extend, said casing also having a spaced plate, a plate interposed between said first mentioned plate and said spaced plate adapted to cooperate with said first mentioned plate, and means for guiding the belt end into securing position when extended through said opening.

3. In a belt fastener, in combination, a casing having a plate with an opening therein through which the ends of the belt are adapted to extend, said casing also having a spaced plate, a friction plate interposed between said first mentioned plate and said spaced plate, and a rib on said friction plate adapted to engage adjacent ends of the belt.

4. In a belt fastener, in combination, a plate having spaced portions around which the ends of the belt are adapted to be looped, securing means adapted to engage the looped ends of the belt, a second plate spaced from said first mentioned plate, and means carried by said second plate for adjusting said securing means.

In testimony whereof I affix my signature.

LARS JOHAN ANDERSSON.